United States Patent [19]

Novotny et al.

[11] Patent Number: 5,084,262

[45] Date of Patent: * Jan. 28, 1992

[54] PROCESS FOR HYDROTHERMAL PRODUCTION OF POTASSIUM SILICATE SOLUTIONS

[75] Inventors: Rudolf Novotny, Duesseldorf; Alfred Hoff, Moers-Schwafheim; Jost Schuertz, Solingen, all of Fed. Rep. of Germany

[73] Assignee: Henkel Kommanditgesellschaft auf Aktien, Duesseldorf, Fed. Rep. of Germany

[*] Notice: The portion of the term of this patent subsequent to Mar. 19, 2008 has been disclaimed.

[21] Appl. No.: 473,263

[22] Filed: Jan. 31, 1990

[30] Foreign Application Priority Data

Jan. 31, 1989 [DE] Fed. Rep. of Germany ....... 3902753

[51] Int. Cl.$^5$ ............................................. C01B 33/32
[52] U.S. Cl. .................... 423/333; 423/332; 423/334
[58] Field of Search ..................... 423/334, 332, 333

[56] References Cited

U.S. PATENT DOCUMENTS 4,520,001 5/1985 Metzger .............................. 423/332
4,770,866 9/1988 Christophliemk et al. ......... 423/326

FOREIGN PATENT DOCUMENTS 649739 12/1964 Belgium .
0164073 5/1985 European Pat. Off. ............. 423/334
968034 1/1958 Fed. Rep. of Germany .
2609831 9/1977 Fed. Rep. of Germany .
3002857 7/1981 Fed. Rep. of Germany .
3313814 10/1983 Fed. Rep. of Germany .
2525204 10/1983 France ................................. 423/332
2541667 3/1984 France ................................. 423/332
1518772 7/1978 United Kingdom .
2078701 1/1982 United Kingdom .

OTHER PUBLICATIONS

Anorganische Technologie II. 4. 1983, pp. 54–63, no translation.
Ullmanns Encyclopedia Chemie, Band 21, 1982, pp. 409–412, no translation.
Ullmanns Encyclopedia Chemia, Band 21, 1982, pp. 439–442, no translation.

*Primary Examiner*—Robert Kunemund
*Assistant Examiner*—Ken Horton
*Attorney, Agent, or Firm*—Ernest G. Szoke; Wayne C. Jaeschke; Norvell E. Wisdom, Jr.

[57] ABSTRACT

The direct hydrothermal production of high purity potassium silicate solutions having a high $SiO_2$:$K_2O$ molar ratio by reaction of a silicon dioxide source with aqueous potassium hydroxide solutions is made possible by using a silicon dioxide source that contains a sufficient fraction of cristobalite phase, or by conditioning other crystalline forms of silicon dioxide by heating at or above 1100° C., but below the melting point of silica, before the hydrothermal treatment. Preferably the potassium hydroxide solution has a concentration range of 10 to 40% by weight, and the reaction is carried out in a closed pressure reactor at temperatures of 150° to 300° C. and under saturated steam pressures corresponding to those temperatures.

18 Claims, 1 Drawing Sheet

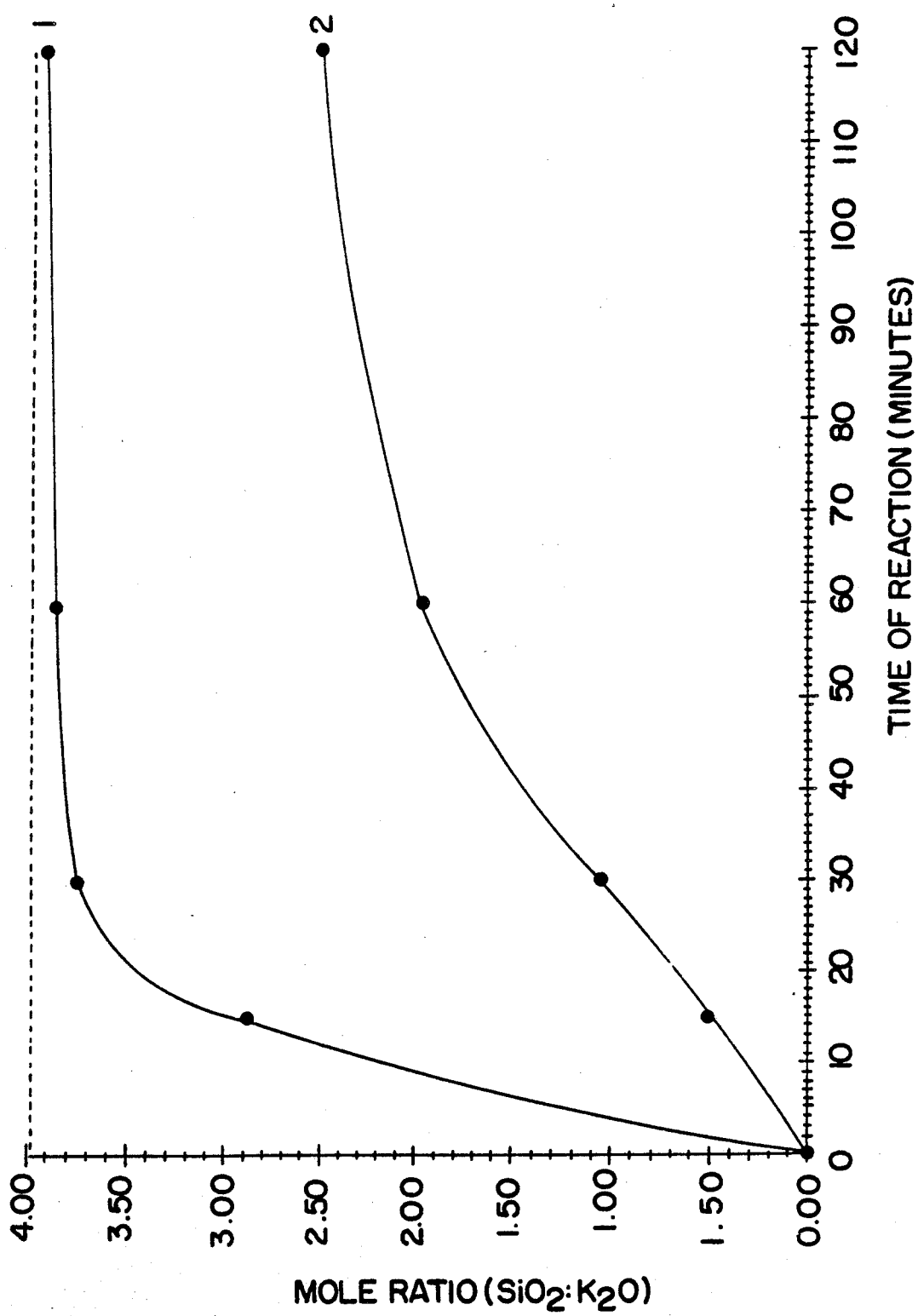

PROCESS FOR HYDROTHERMAL PRODUCTION OF POTASSIUM SILICATE SOLUTIONS

FIELD OF THE INVENTION

The present invention relates to a process for the hydrothermal production of potassium silicate solutions having a high $SiO_2:K_2O$ molar ratio.

STATEMENT OF RELATED ART

A general synopsis of the production of aqueous potassium silicate solutions can be found in the works of Winnacker & Küchler, *Chemische Technologie*, Vol. 3, *Anorganische Technologie II*, 4th Edition, 1983, pages 54–63 in *Ullmanns Encyklopadie der technischen Chemie*, Vol. 21, 4th Edition, 1982, pages 409–412. The term "potassium silicate" does not designate any particular compound with fixed atomic proportions, and in practice potassium silicates are usually characterized in terms of their stoichiometric equivalent ratios of silicon dioxide (also interchangeably called silica herein for brevity) to potassium oxide.

Of the alkali metal silicates known as "waterglass", potassium silicate solutions (also known as potash waterglass) are fairly widely used for industrial purposes. Potash waterglasses predominantly have a solids content of from about 28 to 55% by weight and a molar ratio of silicon dioxide to potassium oxide of 2.0 to 4.2:1. The industrial manufacture of potash waterglasses is generally based on the fusion of quartz sand and potash in suitable furnaces at temperatures in the range from 1400 to 1500° C. The melt which solidifies on cooling ("solid glass") is dissolved in water under pressure at elevated temperature in another process step and the solution obtained is optionally filtered, depending on the quality requirements.

However, this high-temperature fusion process is very expensive both in terms of apparatus and in terms of energy consumption and, in addition, it can produce considerable air pollution by emissions such as dust, nitrogen oxides, and sulfur oxides.

In addition to this high-temperature fusion process, which is the most widely used on an industrial scale, there are hydrothermal processes for the production of aqueous potassium silicate solutions which are described in a number of patent applications. These processes, if they produce potassium silicate solutions with a high $SiO_2:K_2O$ molar ratio, utilize amorphous silicon dioxide, such as that from industrial flue dusts, as the source of silica for the process.

DE-AS 28 26 432 relates to a process for the production of waterglass solutions by reaction of the flue dusts obtained in the production of silicon or ferrosilicon alloys with aqueous alkali metal hydroxide solutions at elevated temperature and subsequent filtration of the solutions obtained. In this process, the flue dust is treated with a 6 to 15% by weight aqueous alkali metal hydroxide solution in an autoclave at temperatures in the range from 120° C. to 190° C. under a pressure of 2.9 to 18.6 bars, the ratio by weight of alkali metal hydroxide solution to solid flue dust being from 2:1 to 5:1. The products of this process have a molar ratio of $SiO_2$ to $K_2O$ of 3,76:1. The flue dusts used as starting materials have a silicon content of 89 to 98% by weight (in the examples in this reference, the silicon content of the flue dust is always 90% by weight), the remainder consisting of impurities.

DE-OS 26 09 831 teaches a process for converting siliceous, polluting waste flue dusts from the manufacture of silicon metal and silicon alloys into silicas or silicates, wherein the following process steps I to III are jointly used:

I. dissolving the flue dusts in alkali hydroxide solutions to form alkali silicate solutions;

II. purifying the alkali silicate solutions to remove organic constituents by treatment with active carbon and/or oxidizing agents and removing the non-digestible residue from the solution;

III. reacting the alkali silicate solutions with inorganic or organic acids and/or salts thereof for further purification.

The akali silicate solutions obtained in this way generally have a molar ratio of $SiO_2$ to $Me_2O$ in the range from 3.3 to 5.0:1.

DE-OS 26 19 604 teaches a process for the production of liquid waterglass from amorphous silicon dioxide and alkali hydroxide, characterized in that siliceous particles in the form of flue dust that has been removed from the waste gases of ferroalloy industries and other industries using silicon furnaces, alkali hydroxide, and water are mixed in a certain ratio by weight and the resulting mixture is heated with stirring to a temperature in the range from 75 to 100° C., after which the liquid obtained is cooled. The siliceous dusts used as starting material for this waterglass production process generally have a silicon dioxide content of 94 to 98% by weight, the balance consisting of impurities. The potash waterglass obtained has a molar $SiO_2:K_2O$ ratio of 3.58:1.

The end products of these known processes for hydrothermal reaction of amorphous silica sources are of poor quality as a result of the impurities typically present in the flue dusts used as starting materials and, accordingly, are of only limited use for industrial products, unless subjected to further purification.

The related art described hereinafter relates to processes for the hydrothermal production of potassium silicate solutions from crystalline form of silicon dioxide, such as sand, and potassium hydroxide. Such state-of-the-art processes can produce only an $SiO_2:K_2O$ molar ratio of less than 2.75:1 by weight in their end products.

DE-OS 33 13 814 teaches a process for the hydrothermal production of clear potassium silicate solutions having a molar ratio of $SiO_2$ to $K_2O$ of 2.75:1 by digestion of crystalline silicon dioxide having an average grain size of from 0.1 to 2 millimeters ("mm"), characterized in that the aqueous potassium hydroxide solution is passed through a bed of silicon dioxide which is formed in a vertical tubular reactor with no mechanical agitation and which is fed downwards with silicon dioxide and a aqueous solution of potassium hydroxide.

Belgian patent 649 739 describes a process and an apparatus for the production of clear sodium silicate solutions by dissolving a silica-containing material under pressure at elevated temperature in aqueous caustic soda, characterized in that the product is separated from the excess silica-containing material and/or from the insoluble contaminated substances by means of filtration elements arranged near he bottom of the reactor, the filtration process advantageously being carried out under temperature and pressure conditions very similar to the reaction conditions. The aqueous sodium silicate solutions obtained in this way have a molar ratio of $SiO_2$ to $Na_2O$ of approximately 2.5:1. Aqueous potassium silicate solutions are also stated to be obtained in a similar way.

Hydrothermal processes of the type in question for the production of soda waterglasses from sand and potassium hydroxide are also discussed in the above-cited work of Winnacker and Küchler. However, it is stated in Winnacker and Küchler (on pages 61 and 62) that it is impossible to produce potash waterglasses by a hydrothermal process, because relatively large quantities of poorly soluble ($KHSi_2O_5$). are formed during the digestion step and can not be dissolved even with subsequent heating.

Accordingly, on the basis of the literature cited above, there is a direct teaching against the feasibility of production of potassium silicate solutions having relatively high $SiO_2:K_2O$ molar ratios from sand or other crystalline $SiO_2$ and potassium hydroxide by a hydrothermal process.

By contrast, a major object of the present invention is to provide a process for the hydrothermal production of potassium silicate solutions by reaction of a crystalline silicon dioxide with aqueous potassium hydroxide solution, in which potassium silicate solutions having molar $SiO_2:K_2P$ ratios of more than 2,75:1 are obtained.

DESCRIPTION OF THE INVENTION AND DRAWING

In this description, except in the working examples and where expressly stated to the contrary, all numbers representing amounts of materials or conditions of reaction or use are to be understood as modified by the term "about".

SUMMARY OF THE INVENTION

The object of the invention is achieved by the reaction of a particular type of solid silica source, specifically one that has been obtained by heating a predominantly crystalline silica source, especially quartz and/or quartz sand, at a temperature of at least 1100° C. prior to hydrothermal reaction and/or consists predominantly of silica in its cristobalite crystal form. The term "predominantly" is to be understood as describing a material that contains more than 50% by volume of the stated predominant material. The solid silica source of the type described above is reacted hydrothermally with a solution that consists essentially of water and dissolved potassium hydroxide (which is, of course, chemically equivalent to "dissolved" potassium oxide).

It should be noted that the two alternative descriptions of the silica source for hydrothermal reaction according to the invention are by no means mutually exclusive. Indeed, while the applicants do not wish to be bound by theory, it is believed that the primary function of the heating of other types of crystalline silica for use in a process according to the invention is to convert these other crystal forms to cristobalite. It should also be noted that both alpha and beta forms of cristobalite are included within the term as used herein.

In general, the higher the content of cristobalite in a silica source identified as containing that material, the more readily it will work in the invention. For economic reasons, however, a silica source obtained by heating sand, or some other cheap natural source of crystalline silica, is often preferred for use in the invention because it is cheaper than natural or conventional synthetic cristobalite. Among the natural sources of silica for this embodiment of the invention, quartz, usually quartz sand, is preferred.

BRIEF DESCRIPTION OF THE DRAWING

The sole drawing figure is a graphical representation of the variation of the $SiO_2:K_2O$ ratio with time of reaction.

DESCRIPTION OF THE PREFERRED EMBODIMENTS

The time of heating crystalline siliceous materials to make them suitable for the invention is not critical. Generally, in order to assure an effective result and allow time for the temperature to rise in all parts of a batch of solid siliceous material to be treated, it is strongly preferred that the material be exposed to heat for at least ten minutes. Heating can be continued as long as desired, but generally for economic reasons the heating time should not be excessive. A time from 10 minutes to 8 hours is preferred, with thirty minutes to one hour generally more preferred.

Irrespective of the source of the silica used in the final hydrothermal reaction step, the aqueous potassium hydroxide used in this part of the process preferably has a concentration range of 10 to 40%, more preferably 15 to 30% by weight, still more preferably 15–25% by weight, of potassium hydroxide or its stoichiometric equivalent of $K_2O$. Also, irrespective of other factor, the hydrothermal reaction preferably is carried out in a pressure reactor, preferably at a temperature of 150 to 300°, more preferably at a temperature of 200 to 230° C., under saturated steam pressure corresponding to the temperature used.

The process according to the invention is easier to handle on an industrial scale and, hence, is less expensive than the heavily polluting state of the art processes with their high energy consumption, i.e. the high temperature fusion processes involving a subsequent dissolving step.

The process according to the invention has the advantage over known hydrothermal processes that, through the use of the silica specially selected in accordance with the invention, it is possible to obtain potassium silicate solutions with a molar ratio of $SiO_2$ to $K_2O$ of more than 2.75:1, which is not possible where unconditioned quartz is used as the $SiO_2$ component.

It has also surprisingly been found that aqueous potassium silicate solutions which have a molar ratio of $SiO_2$ to $K_2O$ of more than 2.75:1 can be directly produced in a single step from silica selected in this way, preferably from a cristobalite formed in this way, by hydro-thermal synthesis under the conditions described above. Even with short reaction times, a high conversion of the reaction components used can be obtained, in high volume per unit time yields with minimal energy consumption.

The potassium silicate solutions thus obtained have an $SiO_2:K_2O$ molar ratio of preferably more than 2.75 up to 4.2:1, more preferably 2.8 to 4.2:1, and most preferably 3.1 to 4.0:1.

In one preferred embodiment of the invention, the aqueous potassium silicate solution is obtained by using as the selected silicon dioxide a quartz which has been heat-treated at temperatures of 1200 to 1700° C. in the presence of catalytic quantities of alkali, changing largely into cristobalite under those conditions, and by reacting the quartz thus heat-treated with aqueous potassium hydroxide solution in a concentration range of 15 to 30% by weight and preferably 15 to 25 % by weight, the reaction being carried out in a closed pressure reactor at a temperature in the range from 200 to 230.C and under the saturated steam pressures corresponding to the temperature.

Cristobalite, like quartz, is a crystal modification of silicon dioxide. It is produced almost entirely synthetically by calcination of quartz in a process in which quartz sand is continuously converted at temperatures of approximately 1500° C. in the presence of catalysts (alkali compounds). Extensive information on cristobalite can be found in *Ullmanns Encyklopadie der technischen Chemie*. Vol. 2, 4th Edition, 1982, pages 439-442.

In the context of the invention, therefore, it is particularly preferred to use as the selected silicon dioxide a quartz which has been treated at temperatures in the range from 1300° C. to 1600° C. in the presence of catalytic quantities of alkali, changing largely into cristobalite under those conditions. In addition, it is of particular advantage to use a freshly heat-treated, still warm cristobalite material for the process according to the invention.

In another preferred embodiment of the process according to the invention, the reaction is carried out in the reactor by using an excess of selected silica of up to 100 mole % and preferably from 2 to 30 mole %, based on the desired molar ratio of $SiO_2$ to $K_2O$ in the potassium silicate solution. In general, the reaction may even be carried out with larger excesses than 100 mole % of selected silica, although this is not generally advantageous on an industrial scale.

In general, any of the reactors conventionally used for the hydrothermal synthesis of soda or potash waterglass may also be used to carry out the process according to the invention. Reactors such as these include, for example, rotating dissolvers, stationary dissolver arrangements, stirrer-equipped reactors, jet loop reactors, tube reactors and, in principle, any reactors which are suitable for reacting solids with liquids under pressure. Reactors such as these are described in detail, for example, in DE-OS 30 02 857, DE-OS 34 21 158, DE-AS 28 26 432, BE-PS 649 739, DE-OS 33 13 814 and DE-PS 968 034.

The potassium silicate solutions (potash waterglass solutions) produced in accordance with the invention may be used for all the usual applications which are known to those skilled in the art and which are described in the relevant literature, for example, as adhesives, as binders in paints, foundry aids, catalyst supports, welding electrode materials, as a component of detergents, and as a constituent of refractory materials.

The invention is illustrated, but not limited, by the following working examples.

EXAMPLES

Examples were carried out both on a laboratory scale and on an industrial scale. A commercially available synthetic cristobalite, obtained by heating naturally occurring quartz sand at 1300 to 1600° C. in the presence of alkali as catalyst, was used as the selected silica in the Examples, except where otherwise noted. This crystalline $SiO_2$ contained >99.0% by weight $SiO_2$.

A cylindrical autoclave externally heated to the reaction temperature by a heat-transfer medium was used for the laboratory tests. Details about the starting materials reacted, reaction conditions, and results of these Examples are shown in Table 1 below.

A horizontally arranged, nickel-clad cylindrical steel pressure vessel with a volume when empty of approximately 24 cubic meters ("$m^3$") was used as the reactor for the industrial scale tests. The pressure vessel rotated about a horizontal shaft at a speed of 6 revolutions per minute ("r.p.m."). It was heated with steam at 20 or 25 bars pressure through an opening in the shaft and an attached tube that provided effective distribution directly into the reaction vessel.

TABLE 1

DETAILS FOR LABORATORY SCALE EXAMPLES 1-6

| | Grams of Starting Materials | | Weight % KOH in the Caustic Potash Solution | Molar Ratio in Starting Materials, $SiO_2:K_2O$ | HT Reaction Conditions | | Composition of the Product Solutions | | |
|---|---|---|---|---|---|---|---|---|---|
| Example Number | Cristobalite | Caustic Potash Solution | | | Time, min | Temperature °C. | $SiO_2$, % | $K_2O$, % | $SiO_2:K_2O$ Molar Ratio |
| 1 | 30.00 | 70.00 | 20.0 | 3.96:1 | 60 | 215 | 28.61 | 11.99 | 3.74:1 |
| 2 | 34.88 | 65.12 | 25.0 | 3.96:1 | 60 | 215 | 34.07 | 13.85 | 3.86:1 |
| 3*1 | 36.04 | 63.96 | 25.0 | 4.19:1 | 60 | 215 | 34.22 | 13.81 | 3.88:1 |
| 4*2 | 37.06 | 62.94 | 25.0 | 4.37:1 | 60 | 215 | 34.50 | 13.75 | 3.93:1 |
| 5*3 | 38.37 | 61.62 | 25.0 | 4.63:1 | 60 | 215 | 34.65 | 13.72 | 3.96:1 |
| 6*3 | 38.37 | 61.62 | 25.0 | 4.63:1 | 120 | 215 | 34.82 | 13.69 | 4.00:1 |

*1Cristobalite excess 5.0%, based on a desired molar ratio of $SiO_2$ to $K_2O$ in the solution of 3.96:1
*2Cristobalite excess 10.0%, based on a desired molar ratio of $SiO_2$ to $K_2O$ in the solution of 3.96:1
*3Cristobalite excess 16.0%, based on a desired molar ratio of $SiO_2$ to $K_2O$ in the solution of 3.96:1
(HT stands for ("hydrothermal")

The aqueous potassium hydroxide solution (caustic potash) required for the process was heated to around 103° C. with vapors from the preceding batch through a Venturi nozzle above the caustic potash storage vessel.

The quantities of cristobalite and caustic potash were determined by weighing machines. The starting materials were introduced into the reactor, which was then closed and set rotating. The reaction mixture was heated to the reaction temperature of approximately 215° C. by the direct introduction of steam and was kept at that temperature. After a reaction time of 30 to 120 minutes ("min") at that temperature, the rotation of the reactor was brought to a stop and the reaction mixture was transferred under its own pressure into an exhaust receiver through a flanged-on pipe. The reaction mixture was then separated via a cyclone separator into vapors and waterglass solution having a temperature of approximately 105° C. The vapors were taken in by a jet apparatus and were used to preheat the mixed potassium hydroxide of the next batch in a Venturi nozzle to the limit of the boiling temperature of the potassium hydroxide solution of approximately 103° C.

The further processing of the waterglass solution with a temperature of approximately 100° C. was carried out either in a sedimentation vessel, for the separation of coarse solids or, where the clarity of the solution has to meet more stringent requirements, with a filter.

The conditions of Example 1 were selected as reaction conditions for the industrial-scale tests. The batch size was 22,000 kilograms ("kg"). The approximately 40% potash waterglass solution obtained had an $SiO_2$:$K_2O$ molar ratio of 3.75:1 and substantially corresponded to the result of the laboratory-scale test.

In one particular embodiment, the hydrothermal process using cristobalite/NaOH solution can take place at relatively high solids concentrations in the reactor because, even with a high $SiO_2$:$K_2O$ molar ratio, the potassium silicate solution has an adequate viscosity range for the process under the reaction conditions of 215° C. and 20 bar. On completion of the reaction, water may be additionally introduced, either under pressure directly into the reactor, or into the exhaust line to a receiving vessel during the process of removal from the reactor vessel, so that the potassium silicate solution which has entered the receiving vessel through the exhaust line is diluted sufficiently, before further processing by sedimentation or filtration, to have a sufficiently low viscosity for effective sedimentation or filtration at temperatures of approximately 100° C.

This modification of the process has the particular advantage that, for a high solids concentration during the hydrothermal reaction in the reactor, the volume yield per unit time (kilograms of solids/cubic meter of reactor volume) is extremely high, the reaction product obtained being diluted outside the reactor as it passes to the receiver vessel.

The experimental conditions particularly studied in Examples 1-6 are discussed briefly below.

EXAMPLE 1

Example 1 illustrates favorable conditions in terms of the relatively low potassium hydroxide solution concentration used. The cristobalite was used in a stoichiometric quantity, based on a selected $SiO_2$:$K_2O$ molar ratio of 3.96:1 to be obtained in the product potassium silicate solution.

EXAMPLE 2

An increased KOH concentration was used in relation to Example 1, for a comparable reaction time, to determine the effect of the NaOH concentration on the reaction velocity and the obtainable $SiO_2$:$K_2O$ ratio in the product solution.

EXAMPLES 3-5

To obtain a relatively high molar ratio of $SiO_2$ to $K_2O$ in the reaction solution, cristobalite was used in an increasing excess (+5%, +10%, and +16% respectively) in relation to Example 1, based on the constant ratio of 3.96:1.

EXAMPLE 6

With a cristobalite excess of 16%, based on a constant ratio of $SiO_2$ to $K_2O$ of 3.96:1, the reaction times were lengthened, compared with Example 5.

EXAMPLE 7

In this group of examples, the synthetic cristobalite used in Examples 1-6 was compared with quartz sand heated at various temperatures before hydrothermal reaction, in order to demonstrate the effect which the quartz conditioning temperature has on the properties of the aqueous potassium silicate solutions produced. Samples of the same type of quartz sand were first heat-treated at temperatures of 850° C. to 1600° C. in the presence or absence of catalytic quantities of alkali, as shown in Table 2, and then hydrothermally reacted with potassium hydroxide solution. To make sure that the heat-treating had reached a stable value, the heat treatment for these examples was for a period of four hours. For comparison, unheated quartz sand of the same type was also reacted with potassium hydroxide solution to potash waterglass under the same hydrothermal reaction conditions, which were as follows:

| | |
|---|---|
| Reaction temperature | 215° C.; |
| Reaction time | 30 mins; |
| Potassium hydroxide concentration | 25% by weight; |
| Amount of silica source used | 49.00 grams |
| Amount of 50 wt % NaOH used | 43.53 grams |
| Amount of additional water used | 43.53 grams |
| Excess of silicon dioxide | 5% (over the molar ratio of 3.46:1) |

The hydrothermal reactions led to the conversions and molar ratios shown in Table 2.

TABLE 2
EFFECT OF SAND PRETREATMENT CONDITIONS ON PRODUCT

| | % Conversion[2] | Solution Content[1] | | $SiO_2$:$K_2O$ Ratios[1] | |
|---|---|---|---|---|---|
| | | % $SiO_2$ | % $K_2O$ | Weight | Molar |
| Theoretical Values[3] | 100 | 35.84 | 13.44 | 2.76:1 | 4.18:1 |
| Sand with no heat treat[4] | 25.10 | 12.32 | 18.40 | 0.67:1 | 1.05:1 |
| 850° C. sand[4] | 18.10 | 9.20 | 19.06 | 0.48:1 | 0.76:1 |
| 850° C. sand*[4] | 25.33 | 12.42 | 18.38 | 0.68:1 | 1.06:1 |
| 950° C. sand[4] | 18.10 | 9.20 | 19.06 | 0.48:1 | 0.76:1 |
| 950° C. sand*[4] | 24.60 | 12.10 | 18.45 | 0.66:1 | 1.03:1 |
| 1100° C. sand*[4] | 52.91 | 22.83 | 16.18 | 1.41:1 | 2.21:1 |
| 1300° C. sand* | 67.57 | 27.42 | 15.21 | 1.80:1 | 2.83:1 |
| 1600° C. sand* | 89.51 | 33.34 | 13.96 | 2.39:1 | 3.74:1 |
| Cristobalite | 89.57 | 33.35 | 13.96 | 2.39:1 | 3.75:1 |

*Indicates treatment with addition of catalytic quantities of alkali.
[1] In the liquid phase after hydrothermal reaction.
[2] Defined as 100 - (% of silica source remaining solid after hydrothermal reaction).
[3] If the conversion were 100%.
[4] Comparative experiment, not according to the invention.

The results in Table 2 show that a quartz heat-treated at temperatures above 1100° C., more especially a quartz heat-treated at temperatures of 1300° C. and higher, surprisingly leads to a higher conversion of the $SiO_2$ content and to a higher molar ratio of silicon dioxide to potassium oxide in the potassium silicate solution than the sand treated at a lower temperature or not heat treated at all.

EXAMPLE 8

The effect of the faster reaction of quartz heat-treated at high temperatures, or of cristobalite, by comparison with an unconditioned quartz is demonstrated in the sole drawing Figure. This shows in graphical form the results of the reaction of cristobalite, together with 25% by weight aqueous potassium hydroxide solution, in amounts to produce a 5% excess of silicon dioxide over the molar ratio of 3.98:1 for $SiO_2$:$K_2O$, in a pressure vessel at 215° C. for reaction times of 15, 30, 60, and 120 minutes. The molar ratio of silicon dioxide to potassium oxide in the liquid phase after reaction for the specified time was determined in each case. This curve is denoted by the reference numeral 1.

For comparison, a thermally untreated quartz sand was reacted under the same reaction conditions as described above and samples were again taken after the reaction times described above to determine the molar ratio. This curve is denoted by the reference numeral 2.

It can be calculated from the data given in the Figure that, in the production process according to the invention where cristobalite is used, a conversion of more than 70% is obtained after only 15 minutes, the conversion being substantially quantitative after a reaction time of only 60 minutes.

By contrast, calculation based on the comparison curve denoted by the reference numeral 2 shows a conversion of only about 20% after 15 minutes and a maximum conversion of only 70%, even after a reaction time of 120 minutes. This is consistent with literature data, which as already noted indicate that hydrothermal reaction of sand with potassium hydroxide can give only reaction products with molar ratio of $SiO_2:K_2O$ not greater than 2.75 even after several hours.

This aptly illustrates the advantages of the process according to the invention.

What is claimed is:

1. A process for production of an aqueous potassium silicate solution having a selected $SiO_2:K_2O$ molar ratio, said selected $SiO_2:K_2O$ molar ratio being greater than 2.75:1, said process comprising the steps of:
   (A) providing a solid silica source selected from the group consisting of
      (1) silica sources that contain more than 50 volume % cristobalite and
      (2) silica sources produced by heating, at a temperature of at least 1100° C. but below the melting point of silica for a time of at least ten minutes, a precursor solid silica source that initially contains at least 50% by volume of crystalline silica; and
   (B) hydrothermally reacting the solid silica source provided in step (A), in a closed pressure reactor at a temperature between about 150 and about 300° C. and under a saturated steam pressure corresponding to the temperature used, with a solution which at the beginning of reaction consists essentially of water and dissolved potassium oxide.

2. A process as claimed in claim 1, wherein the selected $SiO_2:K_2O$ molar ratio is not more than about 4.2:1.

3. A process as claimed in claim 2, wherein the selected $SiO_2:K_2O$ molar ratio in the range from about 2.8 to about 4.2:1.

4. A process as claimed in claim 3, wherein the selected $SiO_2:K_2O$ molar ratio is in the range from about 3.1 to about 4.0:1.

5. A process as claimed in claim 1, wherein the amounts of the solid silica source and of aqueous solution hydrothermally reacted in step (B) are such that the molar ratio of the number of moles of $SiO_2$ in the solid silica source to the number of moles of dissolved $K_2O$ in the aqueous solution is equal to the selected $SiO_2$ $K_2O$ molar ratio.

6. A process as claimed in claim 1, wherein the amounts of solid silica source and of aqueous solution hydrothermally reacted in step (B) are such that the molar ratio of the number of moles of $SiO_2$ in the solid silica source to the number of moles of dissolved $K_2O$ in the aqueous solution exceeds the selected $SiO_2$ $K_2O$ molar ratio by an amount within the range from about 2 to about 30% of the selected $SiO_2:K_2O$ molar ratio.

7. A process as claimed in claim 1, wherein the aqueous solution used in step (B) initially contains dissolved potassium oxide in an amount stoichiometrically equivalent to from about 10 to about 40% by weight of potassium hydroxide.

8. A process as claimed in claim 7, wherein the aqueous solution used in step (B) initially contains dissolved potassium oxide in an amount stoichiometrically equivalent to from about 15 to about 30% by weight of potassium hydroxide, and the temperature during step (B) is in the range from about 200 to about 230° C.

9. A process as claimed in claim 8, wherein the aqueous solution used in step (B) initially contains dissolved potassium oxide in an amount stoichiometrically equivalent to from about 15 to about 25% by weight of potassium hydroxide.

10. A process as claimed in claim 9, wherein the silica source provided in step (A) is of type (2), the precursor silica source is natural quartz sand, the temperature of heating before provision in step (A) is in the range from about 1300° C. to about 1600° C., and the heating before provision in step (A) is performed while the precursor solid silica source is in contact with catalytically effective amounts of alkali for the conversion of quartz to cristobalite.

11. A process as claimed in claim 8, wherein the silica source provided in step (A) is of type (2), the precursor silica source is natural quartz sand, the temperature of heating before provision in step (A) is in the range from about 1300° C. to about 1600° C., and the heating before provision in step (A) is performed while the precursor solid silica source is in contact with catalytically effective amounts of alkali for the conversion of quartz to cristobalite.

12. A process as claimed in claim 7, wherein the silica source provided in step (A) is of type (2), the precursor silica source is natural quartz sand, the temperature of heating before provision in step (A) is in the range from about 1300° C. to about 1600° C., and the heating before provision in step (A) is performed while the precursor solid silica source is in contact with catalytically effective amounts of alkali for the conversion of quartz to cristobalite.

13. A process as claimed in claim 6, wherein the silica source provided in step (A) is of type (2), the precursor silica source is natural quartz sand, the temperature of heating before provision in step (A) is in the range from about 1300° C. to about 1600° C., and the heating before provision in step (A) is performed while the precursor solid silica source is in contact with catalytically effective amounts of alkali for the conversion of quartz to cristobalite.

14. A process as claimed in claim 5, wherein the silica source provided in the step (A) is of type (2), the precursor silica source is natural quartz sand, the temperature of heating before provision in step (A) is in the range from about 1300° C. to about 1600° C., and the heating before provision in step (A) is performed while the precursor solid silica source is in contact with catalytically effective amounts of alkali for the conversion of quartz to cristobalite.

15. A process as claimed in claim 4, wherein the silica source provided in step (A) is of type (2), the precursor silica source is natural quartz sand, the temperature of heating before provision in step (A) is in the range from about 1300° C. to about 1600° C., and the heating before provision in step (A) is performed while the precursor solid silica source is in contact with catalytically effective amounts of alkali for the conversion of quartz to cristobalite.

16. A process as claimed in claim 3, wherein the silica source provided in step (A) is of type (2), the precursor silica source is natural quartz sand, the temperature of heating before provision in step (A) is in the range from about 1300° C. to about 1600° C., and the heating before provision in step (A) is performed while the precursor solid silica source is in contact with catalytically effective amounts of alkali for the conversion of quartz to cristobalite.

17. A process as claimed in claim 2, wherein the silica source provided in step (A) is of type (2), the precursor silica source is natural quartz sand, the temperature of heating before provision in step (A) is in the range from about 1300° C. to about 1600° C., and the heating before provision in step (A) is performed while the precursor solid silica source is in contact with catalytically effective amounts of alkali for the conversion of quartz to cristobalite.

18. A process as claimed in claim 1, wherein the silica source provided in step (A) is of type (2), the precursor silica source is natural quartz sand, the temperature of heating before provision in step (A) is in the range from about 1300° C. to about 1600° C., and the heating before provision in step (A) is performed while the precursor solid silica source is in contact with catalytically effective amounts of alkali for the conversion of quartz to cristobalite.

* * * * *